(12) United States Patent  (10) Patent No.: US 9,141,205 B2
Yoshino  (45) Date of Patent: Sep. 22, 2015

(54) INPUT DISPLAY DEVICE, CONTROL DEVICE OF INPUT DISPLAY DEVICE, AND RECORDING MEDIUM

(71) Applicant: Sharp Kabushiki Kaisha, Osaka-shi, Osaka (JP)

(72) Inventor: Hiroki Yoshino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 17 days.

(21) Appl. No.: 14/146,046

(22) Filed: Jan. 2, 2014

(65) Prior Publication Data

US 2014/0192016 A1  Jul. 10, 2014

(30) Foreign Application Priority Data

Jan. 9, 2013  (JP) ................................. 2013-002147

(51) Int. Cl.
*G06F 3/0354*  (2013.01)
*G06F 3/044*  (2006.01)

(52) U.S. Cl.
CPC ............ *G06F 3/03545* (2013.01); *G06F 3/044* (2013.01)

(58) Field of Classification Search
None
See application file for complete search history.

(56) References Cited

U.S. PATENT DOCUMENTS

| 2006/0017709 | A1  | 1/2006  | Okano |
| 2010/0026649 | A1  | 2/2010  | Shimizu et al. |
| 2012/0154447 | A1* | 6/2012  | Kim et al. ...................... 345/661 |
| 2013/0300710 | A1* | 11/2013 | Cho et al. ....................... 345/174 |
| 2014/0104225 | A1* | 4/2014  | Davidson et al. .............. 345/174 |

FOREIGN PATENT DOCUMENTS

| JP | 07-306752 A | 11/1995 |
| JP | 11-175228 A | 7/1999 |
| JP | 2000-163179 A | 6/2000 |
| JP | 2001-350588 A | 12/2001 |
| JP | 2006-039686 A | 2/2006 |
| JP | 2010-39558 A | 2/2010 |
| JP | 2010-224635 A | 10/2010 |
| JP | 2011-113128 A | 6/2011 |

\* cited by examiner

*Primary Examiner* — Kent Chang
*Assistant Examiner* — Nathan Brittingham
(74) *Attorney, Agent, or Firm* — Keating & Bennett, LLP

(57) ABSTRACT

An input display device including (i) a display screen for displaying information and (ii) a sensor for detecting an input to the display screen, and being capable of accepting input with a pen, is configured such that a control section (i) determines whether or not an input region detected by the sensor is a pen tip input region in which an input is carried out with a pen or a palm region in which an input is carried out by touching a hand holding a pen, in accordance with a size of the input region and (ii) switches a display direction of information on the display screen in accordance with a relative position of the pen tip region and the palm region, the pen tip region and the palm region in which a pen tip input and a palm input are determined to be carried out, respectively.

9 Claims, 13 Drawing Sheets

INPUT DISPLAY DEVICE, CONTROL DEVICE OF INPUT DISPLAY DEVICE, AND RECORDING MEDIUM

This Nonprovisional application claims priority under 35 U.S.C. §119 on Patent Application No. 2013-002147 filed in Japan on Jan. 9, 2013, the entire contents of which are hereby incorporated by reference.

TECHNICAL FIELD

The present invention relates to an input display device including an input device such as a touch panel capable of performing a handwriting input with a pen. Particularly the present invention relates to an input display device for use in a state in which a screen is kept in a horizontal or substantially horizontal position.

BACKGROUND ART

Conventionally, input display devices having a display device on which an input device such as a touch panel lies have been widely used. An example of the touch panel includes a resistive touch panel, a capacitance touch panel, and an optical sensor built-in LCD including optical sensors in pixels of a displaying section thereof.

One of such input display devices is an input display device whose screen is to be used in a horizontal position such as a table-type input display device provided with a screen on its table. In the input display device whose screen is used in a horizontal position, a display direction (direction of an image to be displayed) is changed in accordance with a position of a user relative to the input display device. Previously, various techniques have been proposed as a technique for controlling the display direction by specifying a position of a user.

For example, Patent Literature 1 proposes a technique for controlling a display direction by providing an infrared sensor to a table-type input display device and detecting a user by the infrared sensor so that an image is displayed in a normal direction for the user thus detected.

Patent Literature 2 proposes a technique for determining a display direction by providing sensors at four corners of a screen of an information terminal device and sensing that one of the sensors is touched with a pen. Further, Patent Literature 2 also proposes a technique for determining a display direction suitable for a screen. In the technique of Patent Literature 2, when a display device is powered on, a screen split into four sections is displayed. The four sections are directed to different four directions. One of the four sections is selected by touching the one of the four sections, thereby determining in which one of the display direction the display device should display the screen.

Patent Literature 3 proposes a technique for determining a display direction corresponding to an eye direction of a user. The eye direction of the user is determined in accordance with positions of the user and a pen tip input, which positions are detected by detecting the user by the sensors provided around a table which includes a screen.

On the other hand, Patent Literatures 4 and 5 propose techniques, though which techniques are not a technique for controlling a display direction by specifying a position of a user, for removing an input by touching a screen with a palm other than an intended input by touching a screen with a pen or a finger in a case where a plurality of inputs due to an incorrect input caused by touching a palm on a screen were detected. Specifically, in consideration of a difference between an area of an input by touching a screen with a palm and an area of an input with a pen or a finger, an input having a minimum area is considered to be valid and an input by touching a screen with a palm is considered to be invalid.

CITATION LIST

Patent Literatures

Patent Literature 1
Japanese Patent Application Publication, Tokukai, No. 2001-350588 A (Publication Date: Dec. 21, 2001)
Patent Literature 2
Japanese Patent Application Publication, Tokukaihei, No. 11-175228 A (1999) (Publication Date: Jul. 2, 1999)
Patent Literature 3
Japanese Patent Application Publication, Tokukai, No. 2000-163179 A (Publication Date: Jun. 16, 2000)
Patent Literature 4
Japanese Patent Application Publication, Tokukaihei, No. 7-306752 A (1995) (Publication Date: Nov. 21, 1995)
Patent Literature 5
Japanese Patent Application Publication, Tokukai, No. 2006-39686 A (Publication Date: Feb. 9, 2006)

SUMMARY OF INVENTION

Technical Problem

However, the above conventional techniques for controlling a display direction have the following problems.

For example, according to the technique proposed in Patent Literature 1, in a case where there is a plurality of users around the table-type input display device, it is impossible to further detect which user is going to input. Thus, this technique is unsuitable for a use dealing with a plurality of users.

According to the technique proposed in Patent Literature 2, it is possible to deal with a plurality of users by arranging that the direction of the screen is determined by sensing that a pen touches one of the sensors provided at four corners of a screen. It is also possible to deal with a plurality of users by enabling the screen split into four sections to be displayed not only when power is on but also in response to a user's instruction, and by touching a pen to any one of the four screens. However, a user who inputs is required to touch a sensor with a pen, or to display the screen divided into four sections to touch one of the four sections with a pen in order to specify a display direction every time the user inputs.

According to the technique proposed in Patent Literature 3, when using the input display device, an electronic pen and a seating location of a user need to correspond to each other. Accordingly, in a case where there is a plurality of users, it is required to register a correspondence of an electronic pen to a user for each of the plurality of users.

On the other hand, according to the techniques proposed in Patent Literatures 4 and 5, it is possible to distinguish an input by touching with a palm from an input with a pen or a finger, whereas it is impossible to know in which direction relative to a screen a user who is inputting is located.

The present invention has been made in view of the foregoing problems, and an object of the present invention is to provide an input display device, a control device of the input display device, and a recording medium, each of which is capable of specifying a relative position of a user to a screen so as to display information in a direction suitable for the user in accordance with an input to the screen carried out by the user without requiring the user to perform any special operation only for instructing a display direction of the information.

Solution to Problem

In order to attain the foregoing object, an input display device and a control device of the input display device in accordance with an embodiment of the present invention, which input display device including (i) a display screen for displaying information and (ii) a sensor for detecting an input to the display screen, and being capable of accepting input with a pen, the input display device includes: a first determining section for determining whether an input region detected by the sensor is a pen tip region in which an input is carried out with a pen or a palm region in which an input is carried out by touching a hand holding a pen, in accordance with a size of the input region; a second determining section for determining whether or not the pen tip region and the palm region are regions in which each of the pen tip input and the palm input is carried out by a same user, in accordance with a distance between the pen tip region and the palm region, the pen tip region and the palm region being determined by the first determining section, and a display switching section for switching a display direction of information on the display screen in accordance with a relative position of the pen tip region and the palm region determined by the first determining section.

Advantageous Effects of Invention

An embodiment of the present invention yields an effect that makes it possible to display information in a direction suitable for a user by specifying a position of the user relative to a screen in accordance with an input to the screen by the user without requiring the user to perform any special operation only for instructing a display direction of the information.

DESCRIPTION OF EMBODIMENTS

Figure 1:
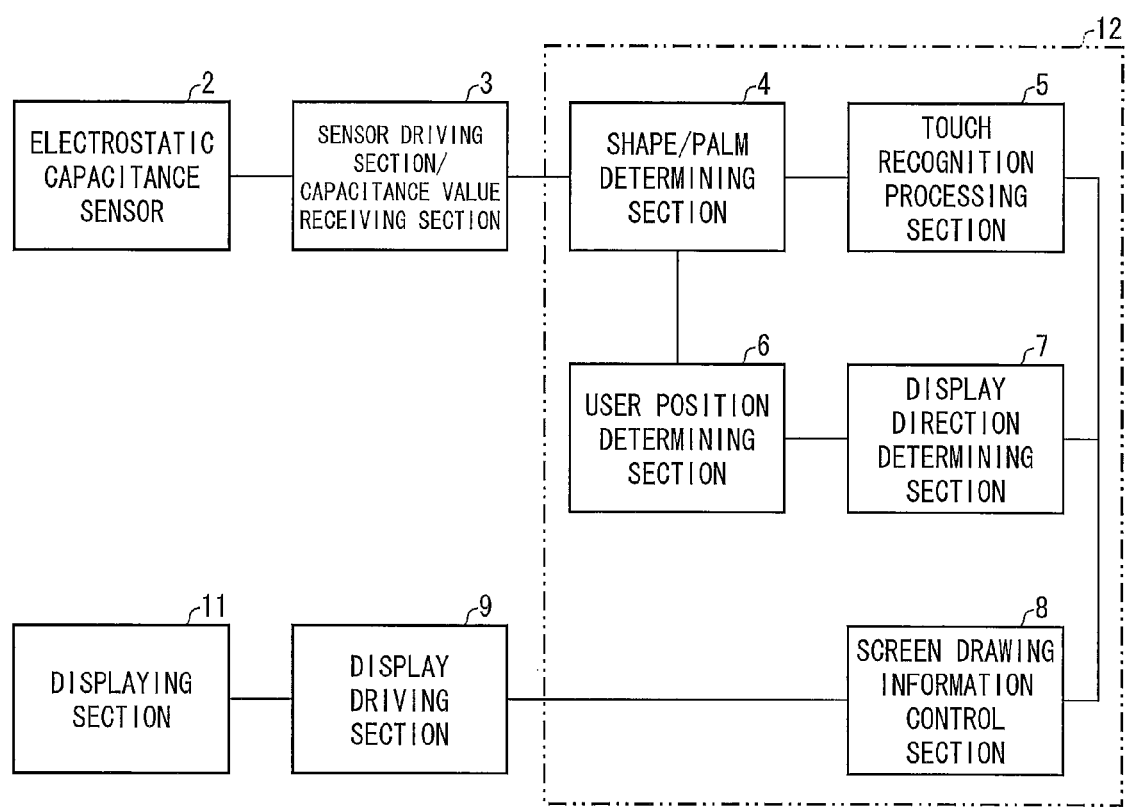
FIG. 1 is a block diagram illustrating a configuration of an input display device of Embodiment 1 of the present invention.

The present invention is described in detail in the following embodiments. Note that, hereinafter, members that have functions and operations identical to each other are given identical reference numerals, and are not described repeatedly.

Embodiment 1

Figure 2:
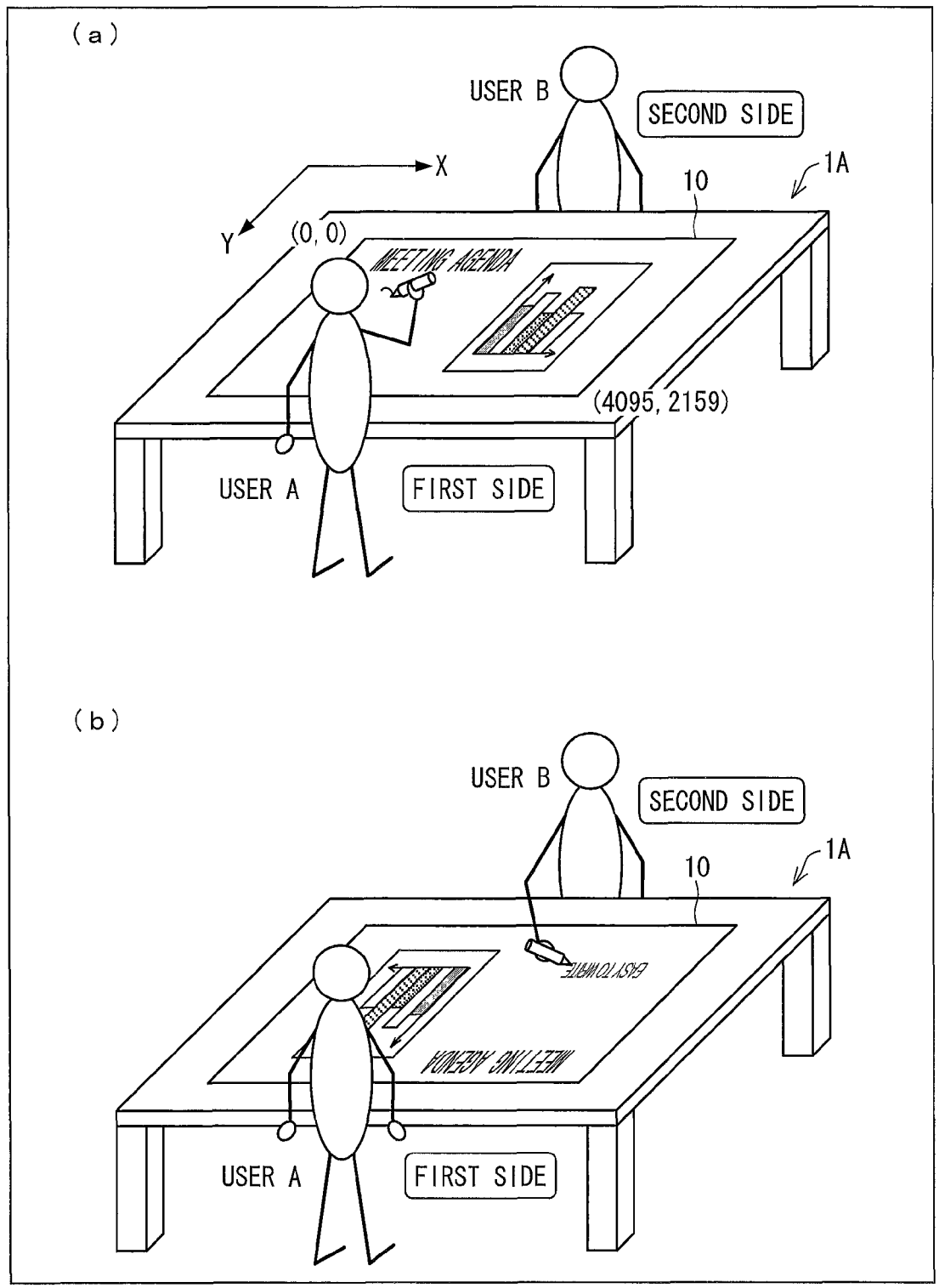
FIG. 2 illustrates a relationship between a position of a user who writes in (inputs to) the input display device of Embodiment 1 and a display direction of an image displayed on an input display screen.

FIG. 2 illustrates a relationship between a position of a user who writes in (inputs to) an input display device 1A of Embodiment 1 of the present invention and a display direction of an image displayed on an input display screen (hereinafter simply referred to as a screen) 10.

(a) of FIG. 2 indicates a state in which an input is carried out by a user A. An image displayed on the screen 10 faces in a normal direction for the user A. In contrast, (b) of FIG. 2 indicates a state in which a user B who faces the user A across the screen 10 starts inputting instead of the user A. In (b) of FIG. 2, the image displayed on the screen 10 is rotated in 180 degrees from a direction in which the user A inputs to a normal direction for the user B. Hereinafter, a user who inputs to the screen 10 is referred to as an input user.

In the input display device 1A as shown in an example of FIG. 2, a first side and a second side facing each other across the screen 10 are each regarded as a position at which a user inputs to the screen 10. Whether the input user is positioned at the first side or the second side is determined in accordance with an input carried out by the user, and a display direction of information displayed on the screen 10 is controlled so as to face in a normal direction for the input user.

FIG. 1 is a block diagram illustrating a configuration of the input display device 1A. The input display device 1A includes (i) a capacitance sensor 2, (ii) a sensor driving section/capacitance value receiving section 3, (iii) a displaying section 11, (iv) a display driving section 9, and (v) a control section 12. The control section (control device) 12 includes a CPU, a ROM, and a RAM (which are not illustrated), and includes (i) a shape/palm determining section 4, (ii) a touch recognition processing section 5, (iii) a user position determining section 6, (iv) a display direction determining section 7, and (v) screen drawing information control section 8.

The capacitance sensor (sensor) 2, which is a touch panel, serves as a sensor capable of detecting a shape of an object on or near the screen 10 of the capacitance sensor 2 by detecting a capacitance between a plurality of lines arranged in a matrix pattern in a plane and the object. The capacitance sensor 2 is capable of detecting, for example, a capacitance of every coordinate in a range of 4096×2160. Note here that, when viewed from a user positioned at the first side, a coordinate is set to (0, 0) at an upper left corner of the screen 10 and a coordinate is set to (4095, 2159) at a lower right corner of the screen 10, and a capacitance is detected for each of the coordinates (see FIG. 2). Note that the touch panel is not limited to the capacitance touch panel or contact/non-contact, but may be any other type provided that a shape of an object on or near the screen 10 of the capacitance sensor 2 can be detected.

The sensor driving section/capacitance value receiving section 3 drives the capacitance sensor 2, thereby detecting a capacitance value. The sensor driving section/capacitance value receiving section 3 transmits thus detected capacitance value to the control section 12.

Figure 3:
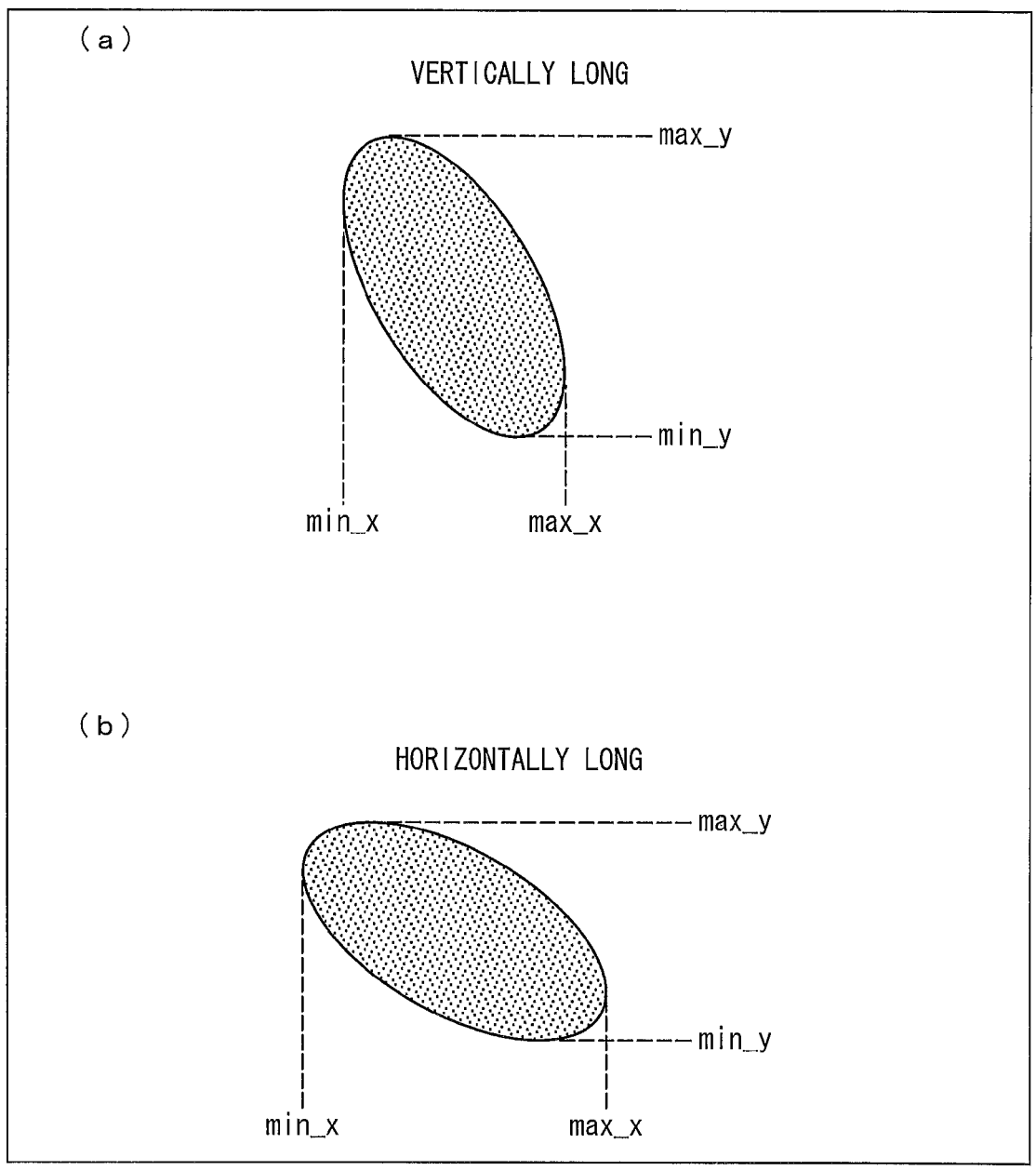
FIG. 3 illustrates a continuous range of an input detected by a capacitance sensor included in the input display device of Embodiment 1.

The shape/palm determining section 4 included in the control section (a first determining section, a second determining section, a third determining section, and a display switching section) 12 determines a shape of the object on or near the screen 10 in accordance with the capacitance value detected by the sensor driving section/capacitance value receiving section 3. The shape of the object on or near the screen 10 corresponds to a shape of a continuous range of an input having capacitance indicative of the presence the object on or near the screen 10. FIG. 3 shows a continuous range of an input detected by the capacitance sensor 2.

The shape/palm determining section 4 (first determining section) determines whether the detected object is a pen tip or a palm in accordance with a size of the detected continuous range of the input. Note that the palm is a contact of a palm or the like to the screen 10. Specifically, the shape/palm determining section 4 (i) compares an area of the continuous range of the input with a predetermined value A, (ii) determines that the detected object is the pen tip when the area of the continuous range of the input is not more than the predetermined value A, or that the detected object is the palm when the area of the continuous range of an input is more than the predetermined value A. Note here that the predetermined value A is an upper limit of a size of an input assumable as a pen tip input.

As illustrated in FIG. 3, whether the continuous range of the input is vertically long or horizontally long is determined in accordance with a minimum value (min_x) and a maximum value (max_x) of an X-axis value, and a minimum value (min_y) and a maximum value (max_y) of a Y-axis value of the continuous range of an input. The continuous range of the input is determined to be vertically long in a case where a length in the Y-axis direction is longer than a length in the X-axis direction, while the continuous range of the input is determined to be horizontally long in a case where the length in the Y-axis direction is shorter than the length in the X-axis direction (see FIG. 3). The shape/palm determining section 4 transmits a result of the determination to the touch recognition processing section 5 and the user position determining section 6.

The touch recognition processing section 5 determines a location of a pen tip in accordance with the result of the determination by the shape/palm determining section 4, and perform an instructed function on a menu when the pen tip is on a menu display and perform a screen drawing process when the pen tip is not on the menu display.

The user position determining section (display switching section) 6 determines a position of an input user relative to the screen 10 in accordance with the result of the determination by the shape/palm determining section 4. The user position determining section 6 is described in detail later. The user position determining section 6 transmits the result of the determination to the screen drawing information control section 8.

The display direction determining section (display switching section) 7 determines a display direction in the screen 10 in accordance with the result of determination transmitted by the user position determining section 6. In this embodiment, a display direction of an entire display content or a menu display displayed on the screen 10 is to be determined. The menu display is a part of the display content displayed on the screen.

The screen drawing information control section (the display switching section and the screen drawing section) 8 includes a storing section (not illustrated). The storing section stores, separately in layers, (i) screen drawing information such as handwritten information and graph information and (ii) menu information which is temporarily displayed over the screen drawing information displayed on the screen 10. In accordance with an instructed function performed on the menu or the screen drawing process performed by the touch recognition processing section 5 and the result of determination of a display direction transmitted from the display direction determining section 7, the screen drawing information control section 8 updates the screen drawing information and the menu information stored in the storage section to be displayed on the displaying section 11.

The display driving section 9 drives the displaying section 11 in accordance with information stored in the storing section included in the screen drawing information control section 8, and displays the information on the displaying section 11.

The displaying section 11 gives information to a user by displaying the information on the screen 10, and is formed in a planner shape such as a liquid crystal display or an EL display. The capacitance sensor 2 is provided so as to be overlapped with an upper surface of the displaying section 11.

Figure 4:
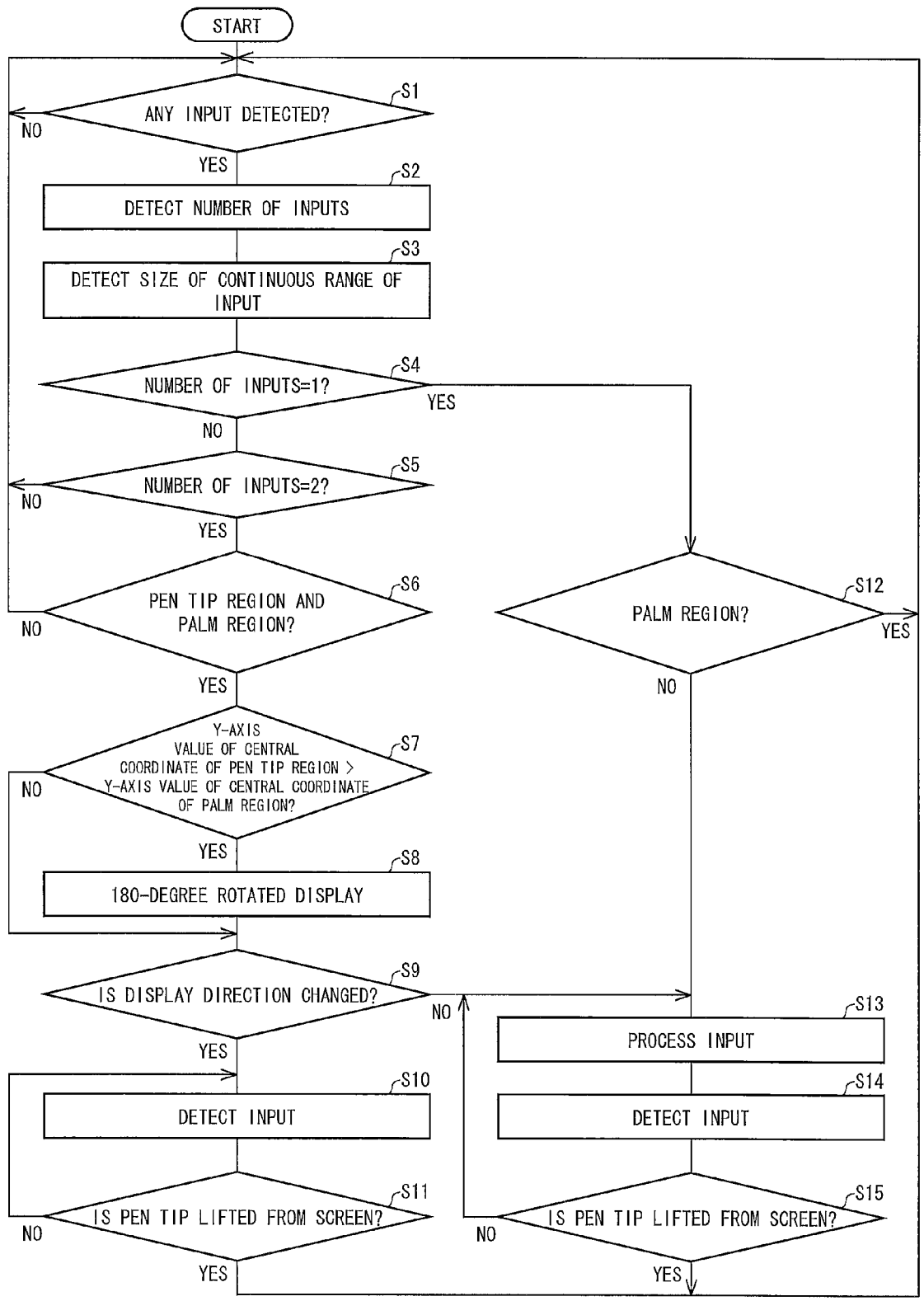
FIG. 4 is a flowchart showing an operation of a display direction control in the input display device of Embodiment 1.

FIG. 4 is a flowchart showing an operation of a display direction control in the input display device 1A. The control section 12 determines whether or not an input to the capacitance sensor 2 by a user is detected, in accordance with a change in a capacitance value detected by the sensor driving section/capacitance value receiving section 3 (S1). In a case where the input by a user is detected, the operation moves on to S2, and in a case where the input is not detected, S1 repeats until the input by a user is detected.

At S2, the control section 12 detects the number of inputs counted by counting each continuous range of an input as one input. For example, in a case where only a pen tip input is detected or only a palm input is detected, a continuous range of an input is counted as one (1), and in a case where a pen tip input and a palm input are both detected, continuous ranges of inputs is counted as two (2).

At S3, the control section 12 detects a size of each continuous range of an input counted as an input at S2. At S4, the control section 12 determines whether or not the number of inputs detected at S2 is one (1). In a case where the number of inputs is one (1), the operation moves on to S12, and in a case where the number of inputs is not one (1), the operation moves on to S5.

At S12, the control section 12 determines whether or not the input(s) is the palm input, namely, whether or not the continuous range of the input thus detected is a palm region in which an input is carried out by touching a screen with a palm. In a case where the detected continuous range of the input is the palm region, S1 repeats. In a case where the detected continuous range of the input is not the palm region, the operation moves on to S13.

Specifically, in a case where the size of continuous range of the input detected at S3 is more than the predetermined value A when comparing the size of continuous range of the input with the predetermined value A (upper limit of a size of an assumed pen tip), thus detected continuous range of the input is determined to be the palm region. In a case where the size of continuous range of the input is not more than the predetermined value A, the continuous range of the input is determined to be a pen tip region in which a pen tip input is carried out.

At S13, the control section 12 finds coordinate values in a center (central coordinates) of the pen tip region and performs the screen drawing process or the instructed function on the menu. In a case where the central coordinates of the pen tip region correspond to a display location of the menu display, the instructed function shown in the display location is performed on the menu, and in a case where the central coordinates do not correspond to the display location of the menu display, a screen drawing process is performed.

At S14, detection of an input is performed again. Detection of an input at S14 is a detection of an input and an input region by the capacitance sensor 2. At S15, the control section 12 determines whether or not the pen tip is no longer detected at S14. In a case where the pen tip is not in contact with the screen 10 and the pen tip is no longer detected, the operation returns to S1 and stands by for a next input. In contrast, in a case where the pen tip is not lifted from the screen 10 and is still detected, the operation returns to S13, and the screen drawing process or the instructed function on the menu is performed on the input region detected at S14.

On the other hand, in a case where the number of inputs detected at S2 is found out not to be 1 at S4 and the operation moves on to S5, the control section 12 determines whether or not the number of inputs is two (2). In a case where the number of inputs is two (2), the operation moves on to S6, and in a case where the number of inputs is not two (2), the operation returns to S1. The case where the number of inputs is not two (2) is a case where another input is detected except a pen tip input and a palm input.

At S6, the control section 12 determines whether or not two inputs detected at S3 are a palm input and a pen tip input, namely, whether or not detected two continuous ranges of inputs are a palm region and a pen tip region. In a case where the two inputs are not a palm region and a pen tip region, the operation returns to S1. In a case where the two inputs are the palm region and the pen tip region, the operation moves on to S7.

Specifically, in a case where a size of any of the two continuous ranges of inputs is not more than the predetermined value A when comparing the size of each of the two continuous ranges of the inputs detected at S5 with the predetermined value A, the two ranges are determined to be a palm region and a pen tip region. In contrast, in a case where the sizes of both of the continuous ranges of the inputs are determined to be more than the predetermined value A, the two ranges are determined not to be a palm region and a pen tip region. An example of the case where the two ranges are not a palm region and a pen tip region includes a case where both of the ranges are the palm regions.

At S7, the control section 12 determines the position of the input user in accordance with where the pen tip region and the palm region are located on the screen 10. Specifically, central coordinates of the pen tip region and central coordinates of the palm region are found, respectively, and Y-axis values of the respective central coordinates are compared with each other, which Y-axis is parallel to a direction in which the first side and the second side face each other. In a case where the Y-axis value of the central coordinates of the pen tip region is more than the Y-axis value of the central coordinates of the palm region, it is determined that the input user is positioned at the second side shown in FIG. 2. This is because the Y-axis value of the pen tip region is always larger than the Y-axis value of the palm region in which a hand holding a pen is placed, in a case where the user B positioned at the second side inputs with an input pen (see (b) of FIG. 2).

In contrast, in a case where the Y-axis value of the central coordinates of the pen tip region is not more than the Y-axis value of the central coordinates of the palm region, the input user is determined to be positioned at the first side shown in FIG. 2. This is because the Y-axis value of the pen tip region is always smaller than the Y-axis value of the palm region in which a hand holding a pen is placed, in a case where the user A positioned at the first side inputs with an input pen (see (a) of FIG. 2).

In a case where the input user is determined to be positioned at the first side relative to the screen 10 at S7, the operation moves on to S9, and in a case where the input user is determined to be positioned at the second side, the operation moves on to S8 and further to S9. At S8, the display direction of the screen 10 is rotated in 180 degrees. In the input display device 1A, a normal direction relative to the user positioned at the first side is set to a default of the display direction. Thus, in a case where the input user is positioned at the second side, the display direction is rotated in 180 degrees from the default of the display direction at S8.

At S9, the control 12 determines whether or not the display direction is changed. In a case where the display direction is changed, the operation moves on to S10, and in a case where the display direction is not changed, the operation moves on to S13. At S10, the control section 12 determines whether or not an input is detected by the capacitance sensor 2. At S11, the control section 12 determines whether or not the pen tip is no longer detected at S10. In a case where the pen tip is not in contact with the screen 10 so that the pen tip is no longer detected, the operation returns to S1. In contrast, in a case where the pen tip is in contact with the screen 10 so that the pen tip is still detected, the operation returns to S10.

The steps S9 to S11 are performed because, in a case where the display direction is changed at S8, a screen drawing position after switching the display direction cannot be specified in a display state displayed before the change of the display direction. The steps S9 to S11 are performed in order that screen information before an input is made on the display after the change of the display direction may not be used to detect and determine whether an input is made on the screen. When the display direction is changed, the input user lifts a pen tip from the screen once and places it on a right position again on the display of the screen 10 with the changed display direction. Thus, in a case where the display direction is changed, it is detected that the pen tip is lifted from the screen and then the operation returns to S1. After the pen tip is placed on the right position suitable for the display after the change of the display direction of the screen 10, the operation moves from S9 on to S13 and then an input corresponding to the display after the change of the display direction starts to be detected.

Embodiment 2

The following description deals with another embodiment of the present invention. Note that, for convenience of description, members that have functions identical to those described in Embodiment 1 are given identical reference numerals, and are not described repeatedly.

According to the input display device 1A of Embodiment 1, it is determined whether an input is carried out at the first side or the second side each faces to each other across the screen 10. In contrast, according to an input display device of Embodiment 2, it is determined in which side of the first side to the fourth side corresponding to the respective four sides of the screen 10, an input is carried out.

Figure 5:
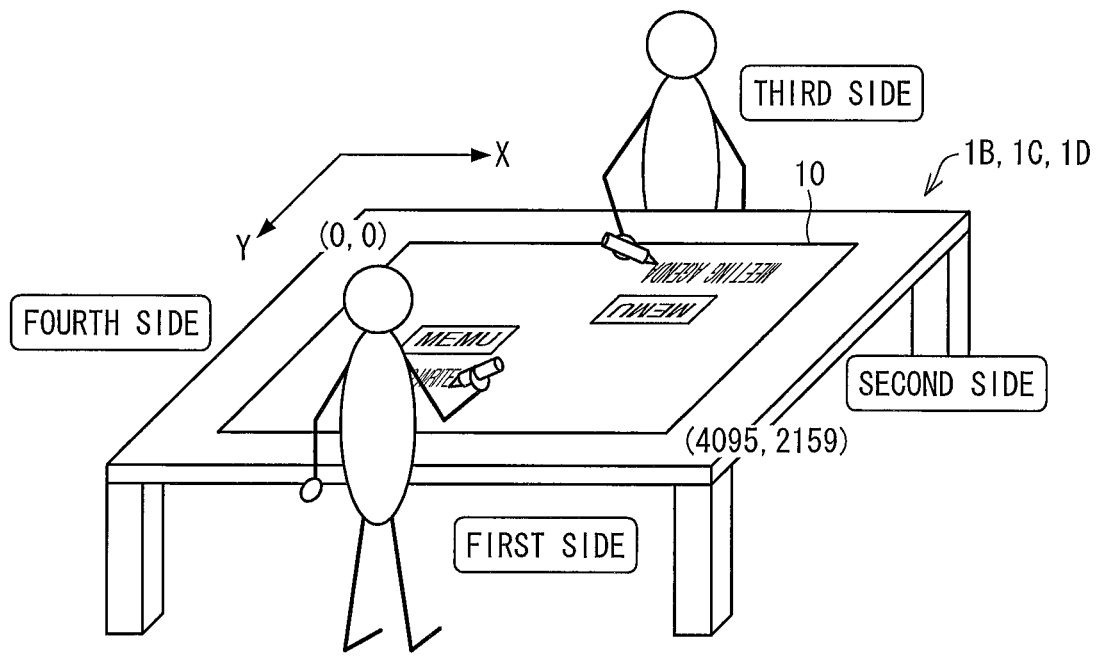
FIG. 5 illustrates a relationship between a position of a user who writes in (inputs to) an input display device of Embodiment 2 and a display direction of an image displayed on an input display screen.

FIG. 5 illustrates a relationship between a position of a user who writes in (inputs to) an input display device 1B of Embodiment 2 of the present invention and a display direction of an image displayed on an input display screen (hereinafter, simply referred to as a screen) 10.

In the present embodiment, it is assumed that (i) the screen 10 is a rectangular and (ii) a display direction is changed by changing a direction of a menu display. However, in a case where the screen 10 is a square or in a case where a part of display contents of the screen 10 might be off the screen 10 so that the part off the screen 10 might not be displayed, a display direction of an entire display content of the screen 10 may be changed as in Embodiment 1. Further, FIG. 5 illustrates two users positioned at the first side and the third side, respectively input to the screen 10. However, four users positioned at the first side to the fourth side, respectively can also input to the screen 10.

Figure 6:
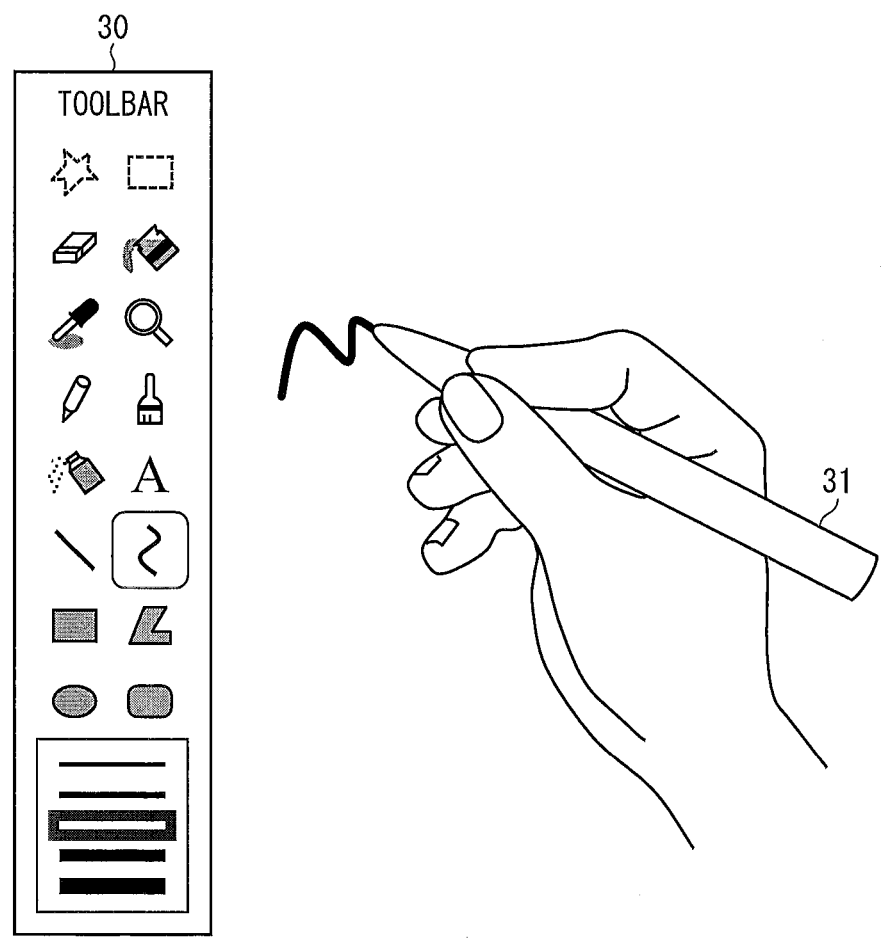
FIG. 6 illustrates a toolbar which is an example of a menu display according to a position of a user who inputs with an input pen to a screen of the input display device of Embodiment 2.

FIG. 6 illustrates a toolbar 30 which is an example of a menu display, which is displayed in a suitable direction for a position of a user who inputs with an input pen 31 to the screen 10 of an input display device.

In a case where both of a pen tip and a palm are determined to be detected at the same time when it is determined whether the palm region is detected or the pen tip region is detected, the shape/palm determining section (the second determining section and the third determining section) 4 determines (i) whether or not a position of the palm relative to the pen tip exists in a predetermined range, in which the palm can be assumed to be carried out by the same user and (ii) whether a shape of the palm is vertically long or horizontally long relative to a predetermined direction. Note that the "at the same time" when both of the pen tip and the palm are determined to be detected at the same time indicates a state in which both of the palm and the pen tip are concurrently in contact with the screen 10, and does not mean that both of the palm and the pen tip start to be in contact with the screen 10 at the same timing.

Figure 7:
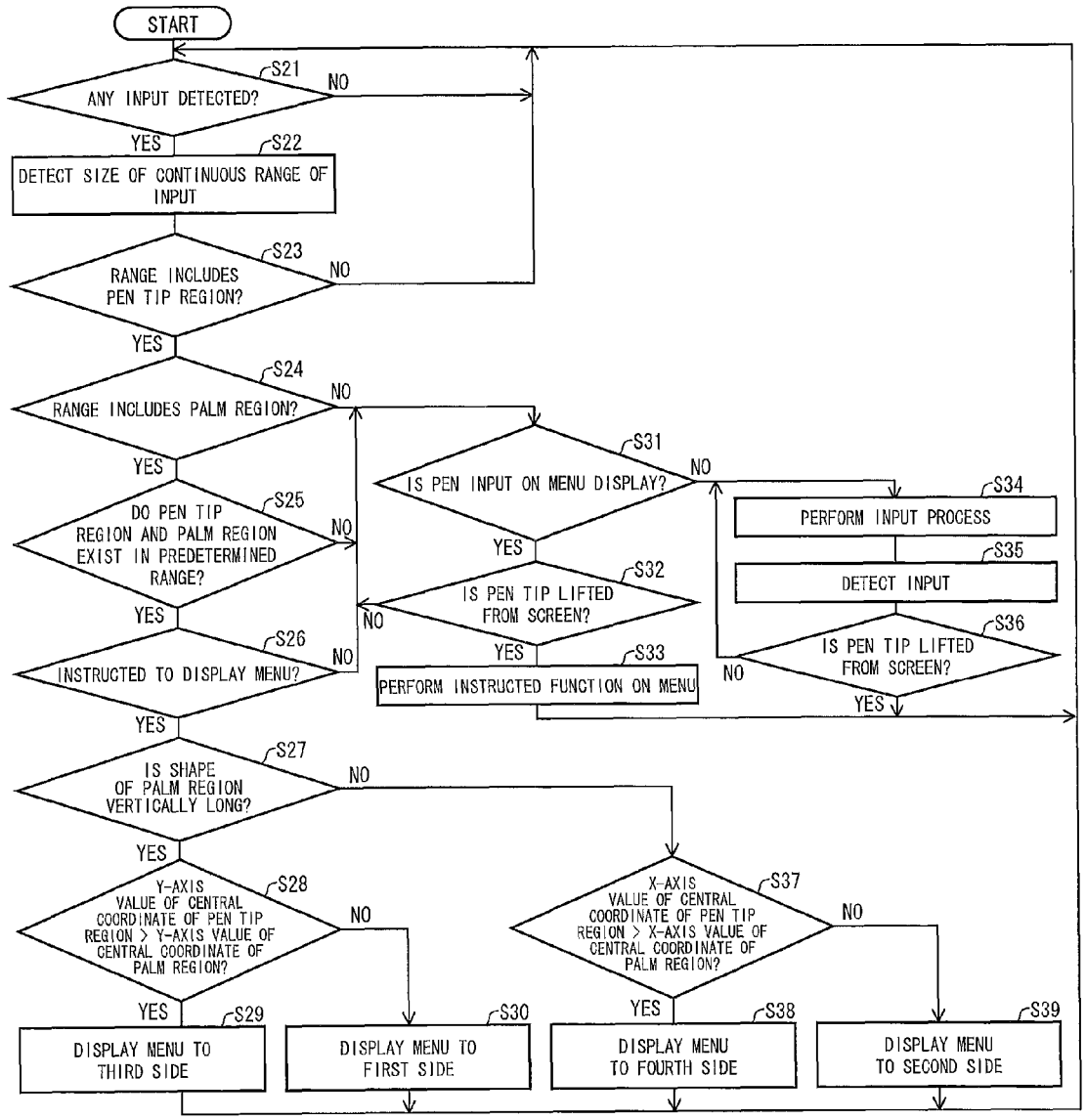
FIG. 7 is a flowchart showing an operation of a display direction control in the input display device of Embodiment 2.

FIG. 7 is a flowchart showing an operation of a display direction control in the input display device 1B. The control section 12 determines whether or not an input to the capacitance sensor 2 by an input user is detected, in accordance with a change in a capacitance value detected by the sensor driving section/capacitance value receiving section 3 (S21). In a case where an input by an input user is detected, the operation moves on to S22, and in a case where an input by an input user is not detected, S21 repeats until an input is detected.

At S22, the control section 12 detects a size of a continuous range(s) of an input(s) in which an input is detected at S21. At S23, in accordance with the size of each the continuous ranges of inputs detected at S22, the control section 12 determines whether or not the pen tip region is included in the continuous ranges of the inputs. In a case where the pen tip region is not included in the continuous ranges of the inputs, the operation returns to S21, and in a case where the pen tip region is included in the continuous ranges of the inputs, the operation moves on to S24.

Specifically, in a case where a size of any of the continuous ranges of the inputs is not more than the predetermined value A when comparing the continuous ranges of the inputs detected at S22 with the predetermined value A, the pen tip region is determined to be included. In a case where a size of all of the continuous ranges of the inputs is more than the predetermined value A, the pen tip region is determined not to be included.

At S24, in accordance with the size of each of the continuous ranges of the inputs detected at S22, the control section 12 determines whether or not the palm region is included. In a case where the palm region is included in the continuous ranges of the inputs, the operation moves on to S25, and in a case where the palm region is not included in the continuous ranges of the inputs, the operation moves on to S31.

Specifically, in a case where the size of any of the continuous ranges of the inputs is more than the predetermined value A when comparing the size of each of the continuous ranges of the inputs detected at S22 with the predetermined value, the palm region is determined to be included. In a case where a size of all of the continuous ranges of the inputs is not more than the predetermined value A, the palm region is determined not to be included.

At S25, the control section 12 determines whether or not (i) the pen tip region determined to be included in the continuous ranges of the inputs at S23 and (ii) the palm region determined to be included in the continuous ranges of the inputs are ranges in which a pen tip input and a palm input are carried out by the same user. Specifically, the control section 12 determines whether or not the pen tip region and the palm region exist in a predetermined range in which positions of the pen tip region and the palm region can be assumed to be regions in which the pen tip input and the palm input are carried out by the same user. In a case where the pen tip region and the palm region exist in the predetermined range, they are determined to be regions in which the pen tip input and the palm input are carried out by the same user. In a case where the pen tip region and the v do not exist in the predetermined range, they are determined not to be regions in which the pen tip input and the palm input are carried out by the same user. In the former case, the operation moves on to S26, and in the latter case, the operation moves on to S31.

At S26, the control section 12 determines whether or not a menu is instructed to be displayed. In a case where the control section 12 determines that the menu is instructed to be displayed, the operation moves on to S27, and in a case where the menu is not instructed to be displayed, the operation moves on to S31. It is possible to employ a separate switch or the like as a means of instructing the menu to be displayed.

At S27, the palm region out of the continuous ranges of inputs detected at S22 is determined whether to be vertically long or horizontally long in accordance with a minimum value (min_x) and a maximum value (max_x) of an X-axis value, and a minimum value (min_y) and a maximum value (max_y) of a Y-axis value. As described earlier, the palm region is determined to be vertically long in a case where a length in the Y-axis direction is longer than a length in the X-axis direction, while the palm region is determined to be horizontally long in a case where the length in the Y-axis direction is shorter than the length in the X-axis direction.

In a case where a shape of the palm region is vertically long (long along the Y-axis), it is possible to determine that an input is carried out at the first side or the third side each of which faces to each other in a direction parallel to the Y-axis in FIG. 5. In a case where the palm region is horizontally long (long along the X-axis), it is possible to determine that an input is carried out at the second side or the fourth side each of which faces to each other in a direction parallel to the X-axis in FIG. 5.

At S27, in a case where the shape of the palm region is determined to be vertically long, the operation moves on to S28, while in a case where the shape of the palm region is determined not to be vertically long, the operation moves on to S37.

At S28, the control section 12 determines whether an input user is positioned at the first side or the third side, in accordance with where the pen tip region and the palm region are located on the screen 10. Note that determination is carried out in the same manner as that of the input display device 1A of Embodiment 1 in which it is determined whether the input user is positioned at the first side or the second side at S7 in the flowchart of FIG. 4.

Specifically, central coordinates of the pen tip region and central coordinates of the palm region are found, respectively, and Y-axis values of the respective central coordinates are compared with each other, which Y-axis is parallel to a direction in which the first side and the third side face each other. In a case where the Y-axis value of the central coordinates of the pen tip region is more than the Y-axis value of the central coordinates of the palm region, it is determined that an input user is positioned at the third side in FIG. 5. In contrast, in a case where the Y-axis value of the central coordinates of the pen tip region is not more than the Y-axis value of the central coordinates of the palm region, it is determined that the input user is positioned at the first side in FIG. 5.

At S28, in a case where the input user is determined to be positioned at the first side, the operation moves on to S30, and in a case where the input user is determined to be positioned at the third side, the operation moves on to S29. At S30, the menu is displayed so as to face in a normal direction for the user positioned at the first side. At S29, the menu is displayed so as to face in a normal direction for the user positioned at the third side.

At S37, the control section 12 determines whether the input user is positioned at the second side or the fourth side, in accordance with where the pen tip region and the palm region are located on the screen 10. Specifically, central coordinates of the pen tip region and central coordinates of the palm region are found, respectively, and X-axis values of the respective central coordinates are compared with each other, which X-axis is parallel to a direction in which the second side and the fourth side face each other. In a case where an X-axis value of the central coordinates of the pen tip region is more than an X-axis value of the central coordinates of the palm region, it is determined that the input user is positioned at the second side in FIG. 5.

At S37, in a case where the input user is determined to be positioned at the second side, the operation moves on to S39, and in a case where the input user is determined to be positioned at the fourth side, the operation moves on to S38. At S39, the menu is displayed so as to face in a normal direction for the user positioned at the second side. At S38, the menu is displayed so as to face in a normal direction for the user positioned at the fourth side.

The steps S27 to S30 and S37 to S39 are carried out to determine a position of an input user in accordance with an input by the input user and to display a menu in a normal direction for the input user.

On the other hand, at S31, the control section 12 fines central coordinates of the pen tip region and determines whether or not the central coordinates of the pen tip region is located on the menu display. Note that, in order that it is determined that the menu is not instructed to be displayed so that the operation moves on to S31, the menu has to be displayed previously at S28, S30, S38, and S39. In a case where the central coordinates of the pen tip region is located on the menu display at S31, the operation moves on to S32. In a case where the central coordinates of the pen tip region is not located on the menu display, the operation moves on to S34.

At S32, it is determined whether or not the pen tip is lifted from the screen 10. In a case where the pen tip is determined to be lifted from the screen 10, the operation moves on to S33 and a program of a menu item from which the pen tip is lifted starts to be executed.

A function selected from the menu items is performed as an input process at S34, a position of the pen tip is detected at S35, and it is determined whether or not the pen tip is lifted from the screen at S36. The steps S34 to S36 repeat until the pen tip is determined to be lifted from the screen.

Embodiment 3

The following description deals with another embodiment of the present invention. Note that, for convenience of description, members that have functions identical to those described in Embodiments 1 and 2 are given identical reference numerals, and are not described repeatedly.

According to the input display device 1B of Embodiment 2, it is determined at which side of the first side to the fourth side an input is carried out, which sides correspond to four sides of the screen 10, and a menu is displayed so as to face in a normal direction for an input user inputting the input. In contrast, according to an input display device 1C of Embodiment 3, in addition to functions of the input display device 1B, a dominant hand of the input user is further detected so that a menu is displayed in a location which is not hidden by a hand.

Figure 8:
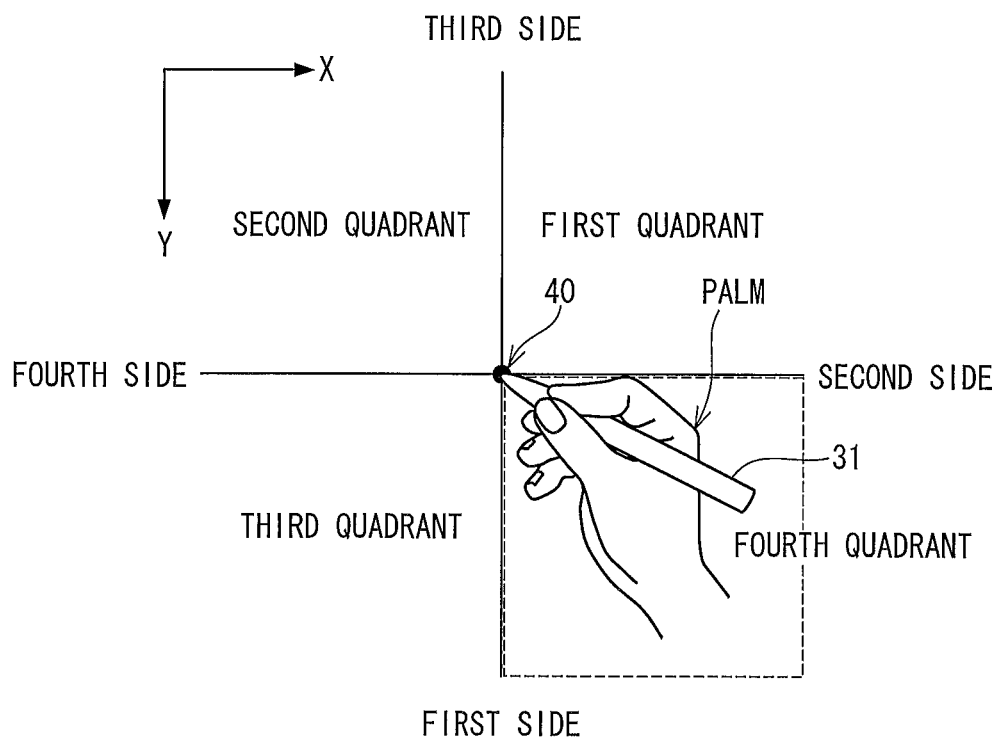
FIG. 8 is a view showing how to determine a position of an input user and a dominant hand thereof in an input display device of Embodiment 3.
Figure 9:
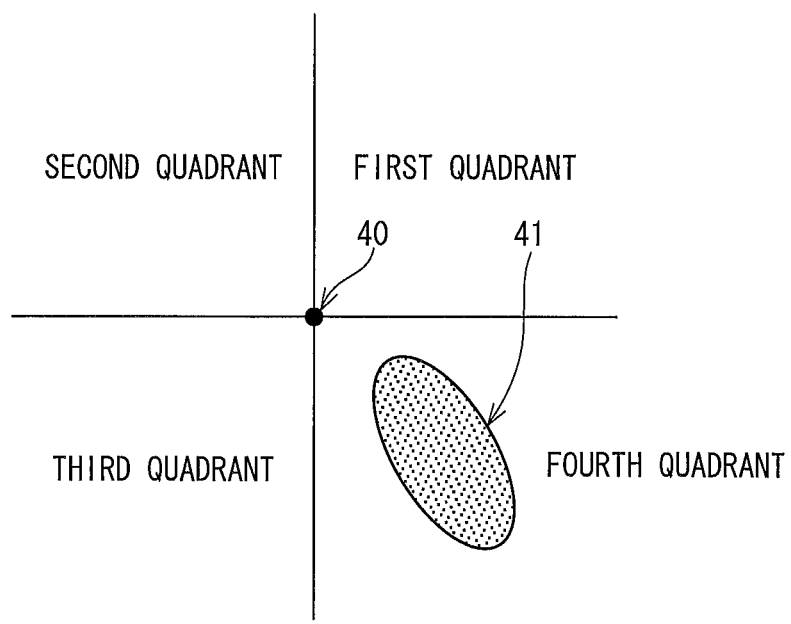
FIG. 9 is a view showing how to determine a position of an input user and a dominant hand thereof in the input display device of Embodiment 3.

FIGS. 8 and 9 show how to determine a position of an input user and whether a dominant hand of the input user is a right hand or a left hand. A change in capacitance shown in FIG. 9 occurs in the capacitance sensor 2 by carrying out an input as shown in FIG. 8. This makes it possible to obtain the pen tip region 40 and the palm region 41.

Here, four quadrants centering on a pen tip region 40 are assumed (see FIG. 8). It is determined (i) in which quadrants a palm region 41 is included and (ii) whether a shape of the palm region 41 is vertically long or horizontally long. It is possible to determine (i) at which side of the first side to the fourth side an input user inputs and (ii) whether the input user is right-handed or left-handed by a combination of a quadrant including the palm region 41 and a shape of the palm region 41. In the present embodiment, the four quadrants are set so as to be in a normal direction relative to the input user positioned at the first side.

Figure 10:
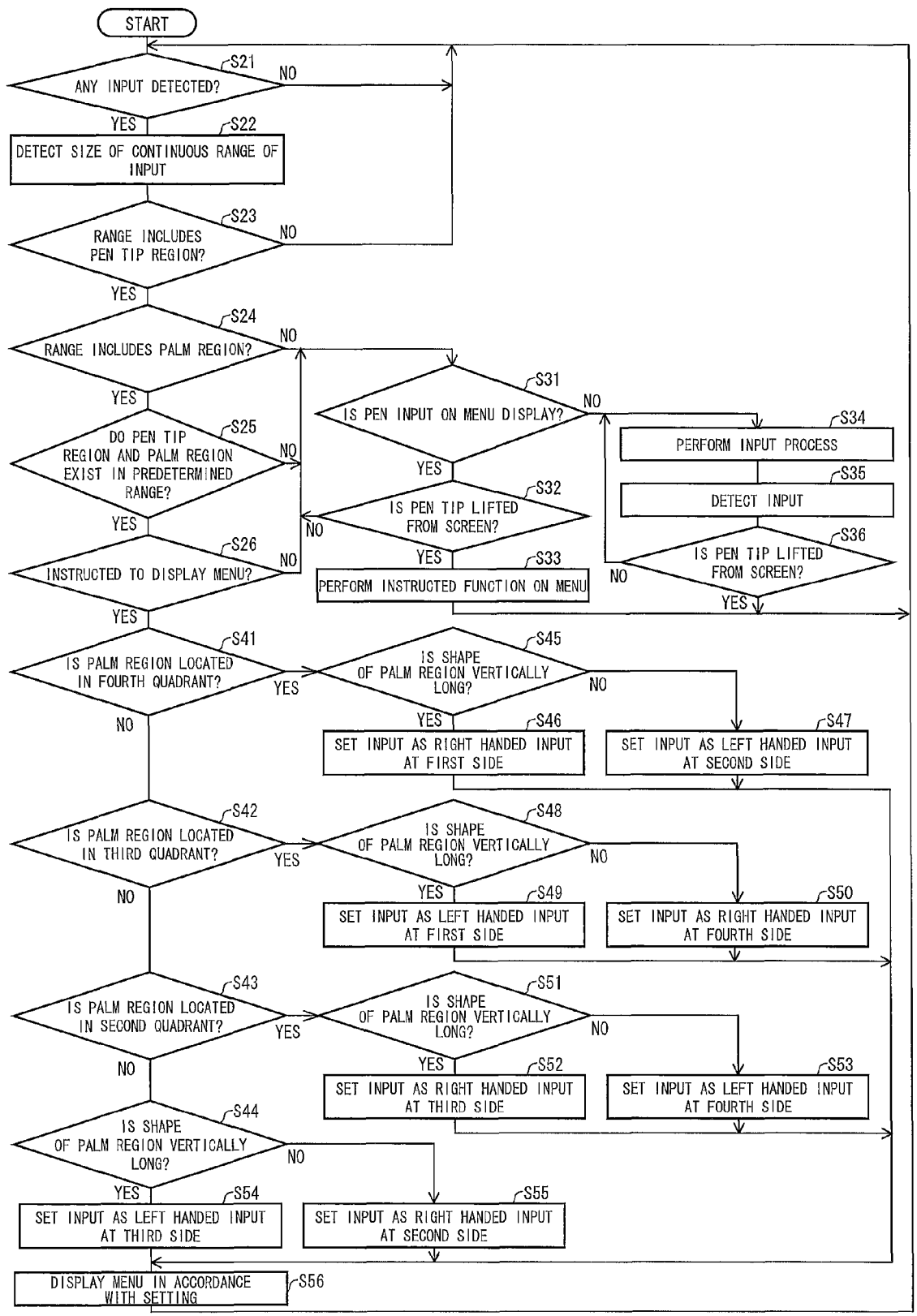
FIG. 10 is a flowchart showing an operation of a display direction control in the input display device of Embodiment 3.

FIG. 10 is a flowchart showing an operation of a display direction control in an input display device 1C. Note that the steps S21 to S26 and S31 to S36 of FIG. 10 are identical to the steps S21 to S26 and S31 to 36 in the flowchart of FIG. 7, so that a description of the steps of FIG. 10 is omitted here.

At S41, the control section 12 determines whether or not the palm region 41 is detected in a fourth quadrant of the assumed four quadrants centering on the pen tip region 41 (see FIGS. 8 and 9). It is the case of a left-handed user positioned at the second side or a right-handed user positioned at the first side when a palm is placed on the fourth quadrant.

In a case where the palm region is detected in the fourth quadrant, the operation moves on to S45 to determine whether the shape of the palm region 41 is vertically long or horizontally long as with the case of S27 in the flowchart of FIG. 7. In the case of an input carried out at the first side or the third side, which sides face each other in a direction parallel to the Y-axis in FIG. 5, the shape of the palm region is vertically long (long along the Y-axis). In the case of an input carried out at the second side or the fourth side, which sides face each other in a direction parallel to the X-axis in FIG. 5, the shape of the palm region is horizontally long (long along the X-axis).

Therefore, in a case where the shape of the palm is vertically long at S45, it is possible to determine that a user is a right-handed user positioned at the first side. Accordingly, the operation moves on to S46 to set an input as a right handed input at first side. In contrast, in a case where the shape of the palm region is horizontally long at S45, it is possible to determine that a user is a left-handed user positioned at the second side. Accordingly, the operation moves on to S47 to set an input as a right handed input at second side.

On the other hand, in a case where the palm region 41 is not detected in the fourth quadrant at S41, the operation moves on to S42 to determine whether or not the palm region 41 is detected in a third quadrant. In the case of a left-handed user positioned at the first side, or in the case of a right-handed user positioned at the fourth side, a palm of the user is placed on the third quadrant.

In a case where the palm region is detected in the third quadrant, the operation moves on to S48 to determine whether the shape of the palm region 41 is vertically long or horizontally long. In a case where the shape of the palm region is vertically long, it is determined that the left-handed user is positioned at the first side. Accordingly, the operation moves on to S49 to set an input as a left handed input at first side. In contrast, in a case where the shape of the palm region is horizontally long at S48, it is determined that the right-handed user is positioned at the fourth side. Accordingly, the operation moves on to S50 to set an input as a right handed input at the fourth side.

In a case where the palm region 41 is not detected in the third quadrant at S42, the operation moves on to S43 to determine whether or not the palm region 41 is detected in the second quadrant. It is the case of the right-handed user positioned at the third side, or the case of the left-handed user positioned at the fourth side when a palm is placed on the second quadrant.

In a case where the palm region 41 is detected in the second quadrant, the operation moves on to S51 to determine whether the shape of the palm region 41 is vertically long or horizontally long. In a case where the shape of the palm region is vertically long, it is determined that the right-handed user is positioned at the third side. Accordingly, the operation moves on to S52 to set an input as a right handed input at the third side. In contrast, in a case where the shape of the palm region is horizontally long at 51, it is determined that the left-handed user is positioned at the fourth side. Accordingly, the operation moves on to S53 to set an input as a left handed input at the fourth side.

In a case where the palm region 41 is detected in the second quadrant at S43, the palm region 41 is inevitably detected in the first quadrant. Accordingly, the operation moves on to S44 to determine whether the shape of the palm region 41 is vertically long or horizontally long. In a case where the shape of the palm region is vertically long, it is determined that the left-handed user is positioned at the third side. Accordingly, the operation moves on to S54 to set an input as a left handed input at the third side. In contrast, the shape of the palm region is horizontally long at S44, it is determined that the right-handed user is positioned at the second side. Accordingly, the operation moves on to S55 to set an input as a right handed input at the second side.

At S56, the menu is displayed in accordance with a position of the input user and information indicative of a dominant hand each set at S46, S47, S49, S50, S52, S53, S54, or S55.

For example, in the case of a right handed input at the first side, the menu is displayed in the third quadrant so as not to be hidden by a right hand of the user who inputs at the first side. In the case of a left handed input at the second side, the menu is displayed in the first quadrant so as not to be hidden by a left hand of the user who inputs at the second side.

Figure 11:
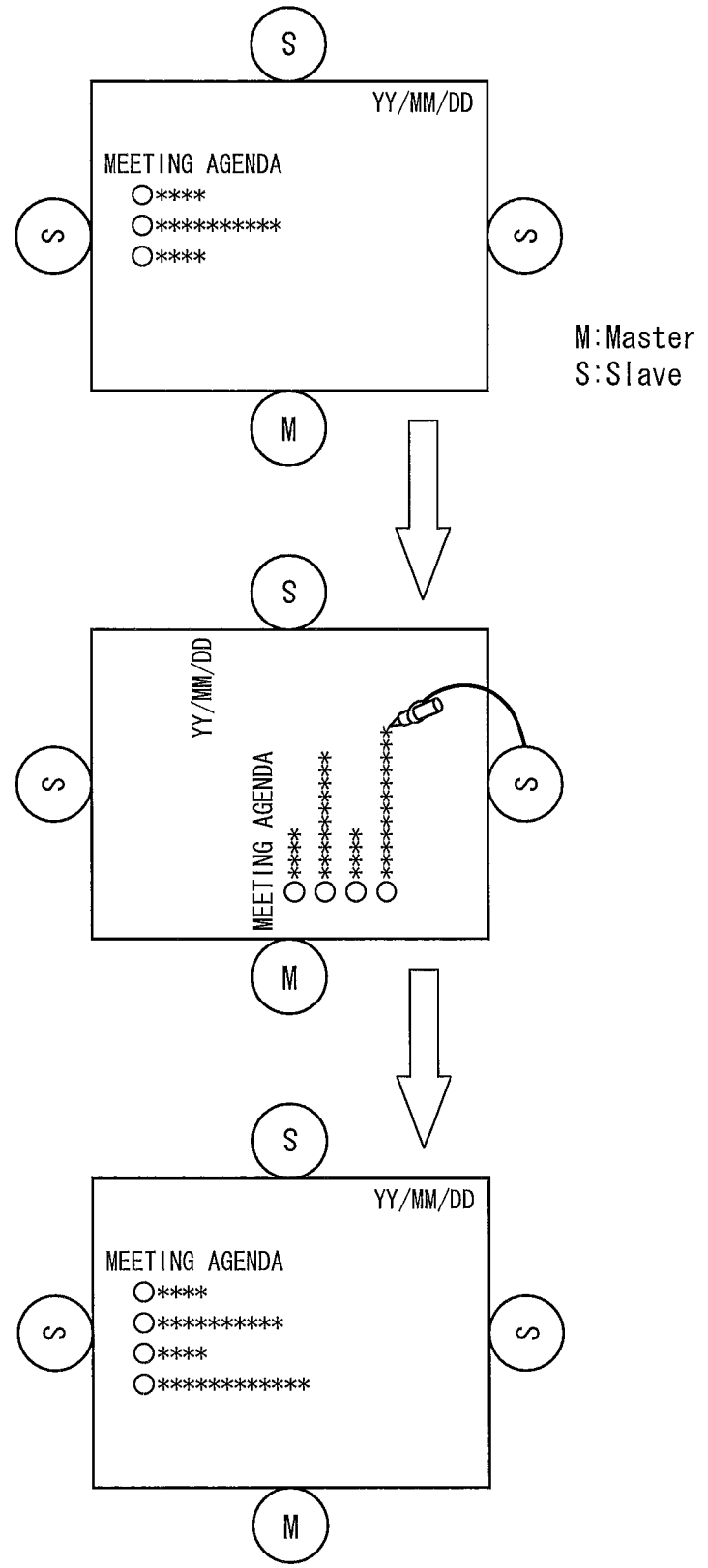
FIG. 11 shows how to switch over a display direction of the input display devices in modified examples of Embodiments 2 and 3.

The descriptions of Embodiments 1 to 3 have dealt with an example of the configuration such that, after the display direction is changed, the display direction is stayed until another user starts to input at a different side. However, a configuration is not limited to this. For example, in a case where a next input is not detected in a predetermined period after the input pen was lifted from the screen or a palm is no more detected, where one of the first side to the fourth side is set as a master side (M) and the other three sides are set as slave sides (S), the display direction may be controlled to be switched back to a display direction which is set to a master side (see FIG. 11). FIG. 11 shows how to switch over a display direction of the input display device of the modified examples of Embodiments 2 and 3.

Embodiment 4

The following description deals with another embodiment of the present invention. Note that, for convenience of description, members that have functions identical to those described in Embodiments 1 and 3 are given identical reference numerals, and are not described repeatedly.

The input display devices 1A and 1B of Embodiments 1 and 2 are explained based on a case where any one of users positioned at the first side to the fourth side. In contrast, an input display device 1D of Embodiment 4 is configured such that a menu is displayed so as to be in a normal direction for each of the users in a case where users positioned at the first side to the fourth side, respectively, input at the same time.

Figure 12:
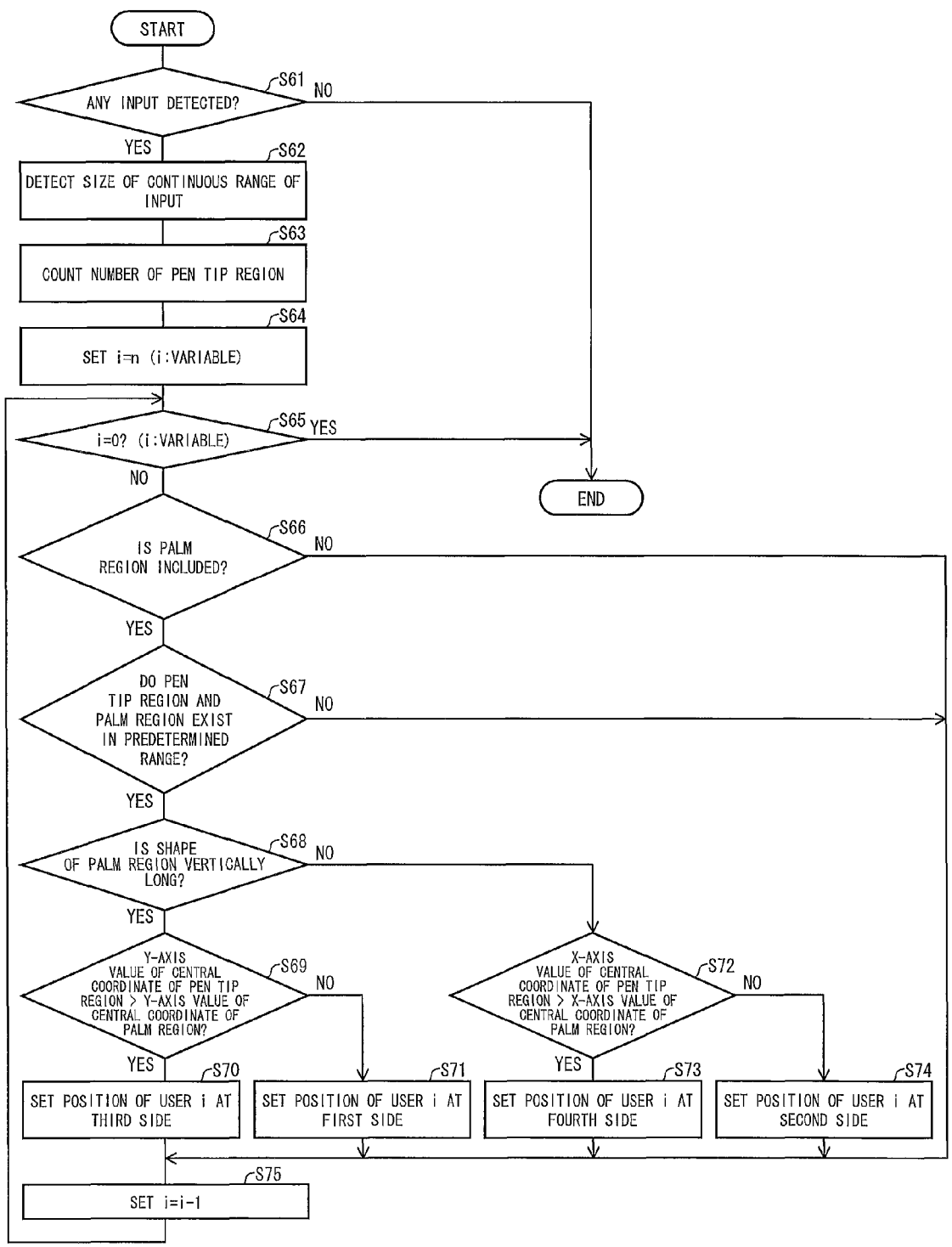
FIG. 12 is a flowchart showing an operation of a display direction control in an input display device of Embodiment 4.
Figure 13:
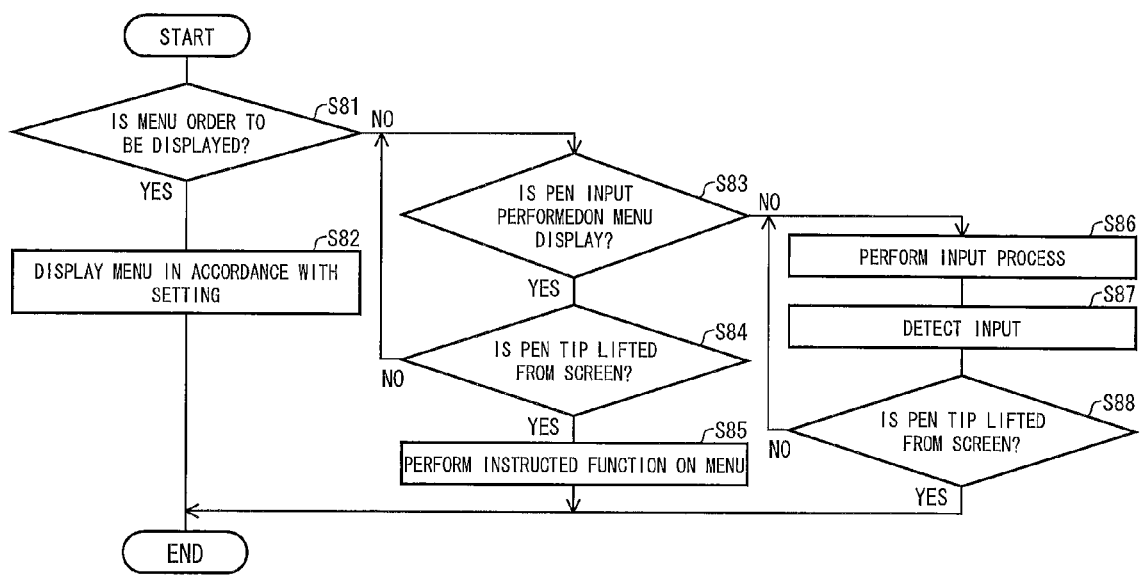
FIG. 13 is a flowchart showing an operation of a display direction control in the input display device of Embodiment 4.

Each of FIGS. 12 and 13 is a flowchart showing an operation of a display direction control in the input display device of Embodiment 4. At S61, the control section 12 determines whether or not an input to the capacitance sensor 2 by a user is detected, in accordance with a change in a capacitance value detected by the sensor driving section/capacitance value receiving section 3. In a case where an input by the user is detected, the operation moves on to S62, and in a case where an input by the user is not detected, the operation ends.

At S62, each size of continuous ranges of inputs where an input detected at S61 is detected. At S63, the control section 12 counts the number of pen tip regions in accordance with the each size of the continuous ranges of the inputs detected at S62. As described earlier, in comparison of the each size of the continuous ranges of the inputs with the predetermined value A, a continuous range of an input having a size of not more than the predetermined value A is determined to be the pen tip region.

At S64, the value counted at S63 is set to a variable i. At S65, it is determined whether or not the variable i is 0. In a case where the variable i is 0, it is determined that there is no region having a size to be processed and the operation ends. In contrast, in a case where the variable i is not 0, the operation moves to S66.

At S66, the control section 12 determines whether or not the palm region is included in the continuous ranges of the inputs detected at S62 in accordance with the each size of the continuous ranges of the inputs detected at S62. In a case where the palm region is included, the operation moves on to S67, and in a case where the palm region is not included, the operation moves on to S75. As described earlier, the continuous range of the input having a size of more than the predetermined value A is determined to be the palm region.

At S67, the control section 12 determines whether or not the pen tip region determined to be included at S63 and the palm region determined to be included at S66 are regions in which the pen tip input and the palm input are carried out by the same user. Specifically, it is determined whether or not the pen tip region and the palm region exist in the predetermined range in which the pen tip input and the palm input are assumed to be carried out by the same user. In a case where the pen tip region and the palm region exist in the predetermined range, the pen tip region and the palm region are determined to be regions in which the pen tip input and the palm input are determined to be carried out by the same user, while in a case where the pen tip region and the palm region do not exist in the predetermined range, the pen tip region and the palm region are determined not to be regions in which the pen tip input and the palm input are carried out by the same user. In a case where it is determined that the pen tip region and the palm region are determined to be regions in which the pen tip input and the palm input are carried out by the same user, the operation moves on to S68. In a case where it is determined that the pen tip region and the palm region are determined not to be regions in which the pen tip input and the palm input are carried out by the same user, the operation moves on to S75.

At S68, it is determined whether the shape of the palm region is vertically long or horizontally long as with S27 in the flowchart shown in FIG. 7. It is the case of an input at the first side or the third side in FIG. 5 when the shape of the palm region is vertically long. It is the case of an input at the second side or the fourth side in FIG. 5 when the shape of the palm region is horizontally long. In a case where the shape of the palm region is vertically long at S68, the operation moves on to S69, and in a case where the shape of the palm region is horizontally long, the operation moves on to S72.

At S69, the control section 12 determines whether an input user of the variable i is positioned at the first side or the third side, in accordance with where the pen tip region and the palm region are located on the screen 10. This determination is carried out in the same manner as that of the input display device 1B of Embodiment 2 in which it is determined whether the input user is positioned at the first side or the third side at S28 in the flowchart of FIG. 7.

In a case where the input user of the variable i is determined to be positioned at the first side, the operation moves on to S71, and in a case where the input user of the variable i is determined to be positioned at the third side, the operation moves on to S70. At S71, a position of the input user of the variable i is set to the first side. At S70, a position of the input user of the variable i is set to the third side.

At S72, the control section 12 determines whether the input user of the variable i is positioned at the second side or the fourth side, in accordance with where the pen tip region and the palm region are located on the screen 10. This determination is carried out in the same manner as that of the input display device 1B of Embodiment 2 in which it is determined whether the input user is positioned at the second side or the fourth side at S37 in the flowchart of FIG. 7.

In a case where the input user of the variable i is determined to be positioned at the second side at S72, the operation moves on to S74, and in a case where the input user is determined to be positioned at the fourth side, the operation moves on to S73. At S74, a position of the input user of the variable i is set to the second side. At S73, a position of the input user of the variable i is set to the fourth side.

In a case where the position of the input user of the variable i is set at S70, S71, S73, or S74, the operation moves on to S75. At S75, 1 is subtracted from the variable i, and the operation returns to S65. This makes it possible to detect positions of a plurality of input users.

In a case where the positions of the plurality of input users are set in an operation of the flowchart of FIG. 12, the operation of the flowchart of FIG. 13 is carried out simultaneously for each of the input users.

It is determined whether or not a menu is instructed to be displayed at S81. In a case where the menu is instructed to be displayed, the operation moves on to S82 to display the menu to a direction set in the process of FIG. 12. Accordingly, the operation ends.

In contrast, in a case where the menu is not instructed to be displayed, the operation moves on to S83. At S83, the control section 12 finds central coordinates of the pen tip region and determines whether or not the central coordinates are located on the menu display. In a case where the central coordinates are located on the menu display, the operation moves on to S84, and in a case where the central coordinates are not located on the menu display, the operation moves on to S86.

At S84, it is determined whether or not the pen tip is lifted from the screen 10. In a case where the pen tip is determined to be lifted from the screen 10, the operation moves on to S85 to perform an instructed function on a menu in a position from which the pen tip is lifted.

At S86, the process selected as an input process from the menu is performed, a position of the pen tip is detected at S87, and whether or not the pen tip is lifted from the screen is determined. The steps S86 to S88 repeat until the pen tip is lifted from the screen.

Because of this, even in a case where a plurality of input users instruct different processes to be carried out, the processes are concurrently carried out. As a result, it is possible to display the menu in a suitable direction relative to the plurality of input users.

Exemplary Embodiments by Use of Software

The control sections 12 of the input display devices 1A to 1D may be realized by a logic circuit (hardware) formed into an integrated circuit (IC chip) or by software with use of CPU (Central Processing Unit).

In the latter case, the input display devices 1A to 1D provided with (i) a CPU for executing commands of programs which are software to realize each function, (ii) a recording medium such as a ROM (Read Only Memory) storing the programs and variety of data so as to be read out by a computer (or CPU), and a recording device, and (iii) a RAM (Random Access Memory) for loading the programs thereon, or the like. The computer (or CPU) reads out the program from the recording medium and executes the program, so that the object of the present invention is achieved. An example of the recording medium includes a "tangible medium which is lasting" such as a tape, a disc, a card, a semiconductor memory, and a programmable logic circuit. Further, the program may be supplied to the computer via any transmission medium (communication network, airwave, etc.) which is capable of transmitting the program. Note that the present invention can be realized in the form of a data signal embedded in carrier waves, into which data signal the program is converted by electronic transmission.

Summary

The input display device (1A, 1B, 1C, 1D) of Embodiment 1 of the present invention including (i) a display screen (displaying section 11, input display screen 10) for displaying information and (ii) a sensor (capacitance sensor 2) for detecting an input to the display screen, and being capable of accepting input with a pen (input pen 31), includes: a first determining section (control section 12, shape/palm determining section 4) for determining whether an input region detected by the sensor is a pen tip region in which an input is carried out with a pen or a palm region in which an input is carried out by touching a hand holding a pen, in accordance with a size of the input region; and a display switching section (control section 12, user position determining section 6, display direction determining section 7) for switching a display direction of information on the display screen in accordance with a relative position of the pen tip region and the palm region determined by the first determining section.

According to the configuration, the first determining section determines whether the input region detected by the sensor is the pen tip region in which an input is carried out with a pen or the palm region in which an input is carried out by touching a hand holding a pen, in accordance with the size of the input region. The pen tip region is a region in which a pen tip input is assumed to be carried out, and is sufficiently smaller than the palm region, so that the pen tip region and the palm region are distinguishable according to a size thereof.

The display switching section switches a display direction of information on the display screen in accordance with a relative position of the pen tip region and the palm region, the pen tip region and the palm region in which a pen tip input and a palm input are determined as being carried out by the same user, respectively. In a case where the pen tip input and the palm input are carried out by the same user, the pen tip region is always farther away from a position of a user than the palm region is. Thus, it is possible to specify the position of a user in accordance with a relative position of the pen tip region and the palm region.

This makes it possible to display information in a direction suitable for a user by specifying a position of the user relative to a screen in accordance with an input to the screen by the user without requiring the user to perform a special operation only for instructing a display direction of the information.

The input display device of Embodiment 2 of the present invention may be configured to further include a second determining section for determining whether or not the pen tip region and the palm region are regions in which each of the pen tip input and the palm input is carried out by a same user, in accordance with a distance between the pen tip region and the palm region, the pen tip region and the palm region being determined by the first determining section, and may be configured such that the display switching section switching the display direction of information on the display screen in accordance with the relative position of the pen tip region and the palm region, the pen tip region and the palm region in which the pen tip input and the palm input are determined by the second determining section as being carried out by the same user, respectively.

According to the configuration, the second determining section determines whether or not the pen tip region and the palm region are regions in which a pen tip input and a palm input palm input are carried out by the same user, respectively, the pen tip region and the pen tip input region has been determined by the first determining section. This determination can be carried out by determining whether or not the pen tip region and the palm region have a distant relationship (are in a range of distance) in which the pen tip input and the palm input are assumed to be carried out by the same user.

The display switching section switches a display direction of information on the display screen in accordance with a relative position of the pen tip region and the palm region, the pen tip region and the palm region in which the input and the palm input are determined to be carried out by the same user, respectively.

This makes it possible to prevent a display from being switched wrongly by incidentally detecting, at the same time, a pen tip region a palm region in which a pen tip input and a palm input are assumed to be carried out by the same user.

The input display device of Embodiment 3 of the present invention may be configured to further include a third determining section for determining whether a shape of the palm region out of the pen tip region and the palm region is vertically long or horizontally long, the pen tip region and the palm region being determined by the second determining section in Embodiment 2 as being carried out by the same user, respectively, and may be configured such that the display switching section switches a display direction of information on the display screen in accordance with (i) the relative position of the pen tip region and the palm region determined by the second determining section as being carried out by the same user and (ii) information indicative of the shape of the palm region determined to be vertically long or horizontally long by the third determining section.

It is possible to specify a position of an input user relative to the screen by determining whether the shape of the palm region is vertically long or horizontally long.

According to the configuration, the third determining section determines whether the shape of the palm region out of the pen tip region and the palm region is vertically long or horizontally long, the pen tip region and the palm region in which the pen tip input and the palm input are determined to be carried out by the same user, respectively, and the display switching section switches a display direction of information on the display screen in accordance with (i) the relative position of the pen tip region and the palm region determined by the second determining section as being carried out by the same user and (ii) information indicative of the shape of the palm region determined to be vertically long or horizontally long by the third determining section.

In a case where two users input respectively at two sides making a corner, one of shapes of palm regions of the respective users is vertically long and the other is horizontally long. Therefore, it is possible to determine at which side of four sides of a screen an input is carried out, by determining whether the shape of the palm region is vertically long or horizontally long.

The input display device of Embodiment 4 of the present invention may be configured to further include a screen drawing section for displaying a screen in accordance with an input detected by the sensor, and may be configured such that when the pen tip region has triggered switching-over of the display direction of information by the display switching section, the screen drawing section not recognizing the pen tip region as an input to the screen.

According to the configuration, it is possible not to use screen information before an input is made on the display after the change of the display direction. This is because a screen drawing position after switching the display direction cannot be specified in a display state displayed before the change of the display direction.

The input display device of Embodiment 5 of the present invention can be configured such that, in Embodiments 1 to 4, in a case where a plurality of pen tip regions are determined to exist by the first determining section: the second determining section specifies, for each of the plurality of pen tip regions, a palm region corresponding to the pen tip region in accordance with a relative position of the pen tip region and the palm region, the palm region corresponding to the pen tip region being a palm region in which a palm input can be determined to be carried out by the same user who carries out a pen-tip input of the pen tip region; and the display switching section switches a display direction of information in a display region corresponding to each of the plurality of pen tip regions on the display screen, in accordance with the relative position of the pen tip region and the palm region, the pen tip region and the palm region in which the pen tip input and the palm input are determined, by the second determining section, as being carried out by the same user, respectively.

According to the configuration, for each input region determined to be the pen tip region by the first determining section, the second determining section specifies a palm region in which a palm input is determined to be carried out by the same user, in accordance with a relative position of the pen tip region and the palm region, and the display switching section switches a display direction of information on the display screen corresponding to each of the plurality of the pen tip regions on the display screen, in accordance with a relative position of the pen tip region and the palm region, the pen tip region and the palm region in which the pen tip input and the palm input are determined to be carried out by the same user, respectively.

This makes it possible to switch the display direction of information in accordance with positions of users even in a state in which the users simultaneously input at the four sides of the screen, respectively.

The input display device of Embodiment 6 of the present invention may be configured, in Embodiments 1 to 5, such that the display switching section switches a display direction of a menu for selecting functions.

A control device (control section 12) of the input display device of the embodiments of the present invention may be realized by a computer. In this case, by causing a computer to operate as each member of the control device of the input display device, the present invention also encompasses a control program of an input display device in which the control device is realized by the computer, and a computer-readable recording medium in which the control program is recorded.

The present invention is not limited to the description of embodiments above, but may be altered by a skilled person within the scope of the claims. An embodiment based on a proper combination of technical means disclosed in different embodiments is encompassed in the technical scope of the present invention. Further, it is possible to provide a new technical feature by combination of technical means disclosed in the description of the embodiments.

INDUSTRIAL APPLICABILITY

The present invention is applicable to a handwriting input display device including an input device such as a touch panel, which handwriting input display device is particularly used in a state in which a screen is kept in a horizontal or substantially horizontal position.

REFERENCE SIGNS LIST

1A to 1D Input display device
2 Capacitance sensor (Sensor)
3 Sensor driving section/capacitance value receiving section
4 Shape/palm determining section (First determining section, Second determining section, Third determining section)
5 Touch recognition processing section
6 User position determining section (Display switching section)
7 Display direction determining section (Display switching section)
8 Screen drawing information control section (Display switching section, Drawing section)
9 Display driving section
10 Input display screen
11 Displaying section
12 Control section (Control device, First determining section, Second determining section, Third determining section, Display switching section)
30 Toolbar
31 Input pen (Pen)
40 Pen tip region
41 Pen tip region

The invention claimed is:

1. An input display device, comprising:
a display screen configured to display information;
a sensor configured to detect an input to the display screen, and to accept input from a pen;
a first determining processor configured or programmed to determine whether an input region detected by the sensor is a pen tip region in which the input is carried out with the pen or a palm region in which the input is carried out by touching a hand, in accordance with a size of the input region;
a second determining, processor configured or programmed to determine whether or not the pen tip region and the palm region are regions formed by a same user, on the basis of a distance between the pen tip region and the palm region, the pen tip region and the palm region being determined by the first determining processor; and
a display switching controller configured or programmed to switch a display direction of information on the display screen in accordance with a relative position of the pen tip region and the palm region determined by the second determining processor as being made by the same user so that the display direction of the information on the display screen is displayed in a manner which is oriented towards the same user.

2. The input display device as set forth in claim 1, further comprising:
a third determining processor configured or programmed to determine whether a shape of the palm region outside of the pen tip region and the palm region is vertically long or horizontally long, the pen tip region and the palm region being determined by the second determining processor as being carried out by the same user, respectively, wherein
the display switching controller is configured or programmed to switch the display direction of information on the display screen in accordance with (i) the relative position of the pen tip region and the palm region determined by the second determining processor as being carried out by the same user and (ii) information indicative of the shape of the palm region determined to be vertically long or horizontally long by the third determining processor section.

3. The input display device as set forth in claim 1, further comprising a screen drawing controller configured to display a screen in accordance with an input detected by the sensor, and
when the pen tip region has triggered switching-over of the display direction of information by the display switching section, the screen drawing controller does not recognize the pen tip region as the input to the screen.

4. The input display device as set forth in claim 1, wherein, in a case where a plurality of pen tip regions are determined to exist by the first determining processor:

the second determining processor specifies, for each of the plurality of pen tip regions, a palm region corresponding to the pen tip region in accordance with a relative position of the pen tip region and the palm region, the palm region corresponding to the pen tip region being a palm region in which the palm input can be determined to be carried out by the same user who carries out the pen tip input of the pen tip region; and the display switching controller switches the display direction of information in a display region corresponding to each of the plurality of pen tip regions on the display screen, in accordance with the relative position of the pen tip region and the palm region, the pen tip region and the palm region in which the pen tip input and the palm input are determined, by the second determining processor, as being carried out by the same user, respectively.

5. A control device of an input display device comprising:

a display screen configured to display information:

a sensor configured to detect an input to the display screen, and to accept input from a pen;

a first determining processor configured or programmed to determine whether an input region detected by the sensor is a pen tip region in which the input is carried out with the pen or a palm region in which the input is carried out by touching a hand, in accordance with a size of the input region;

a second determining processor configured or programmed to determine whether or not the tip pen region and the palm region are regions formed by a same user, on the basis of a distance between the pen tip region and the palm region, the pen tip region and the palm region being, determined by the first determining processor; and a display switching controller or programmed configured to switch a display direction of information on the display screen in accordance with a relative position of the pen tip region and the palm region determined by the second determining processor as being made by the same user so that the display direction of the information on the display screen is displayed in a manner which is oriented towards the same user.

6. The control device of the input display device as set forth in claim 5, further comprising:

a third determining processor configured or programmed to determine whether a shape of the palm region outside of the pen tip region and the palm region is vertically long or horizontally long, the pen tip region and the palm region being determined by the second determining processor as being carried out by the same user, respectively, wherein the display switching controller is configured or programmed to switch the display direction of information on the display screen in accordance with (i) the relative position of the pen tip region and the palm region determined by the second determining processor as being carried out by the same user and (ii) information indicative of the shape of the palm region determined to be vertically long or horizontally long by the third determining processor.

7. The control device of the input display device as set forth in claim 5, further comprising a screen drawing controller configured or programmed to display a screen in accordance with an input detected by the sensor, and when the pen tip region has triggered switching-over of the display direction of information by the display switching section, the screen drawing controller does not recognize the pen tip region as the input to the screen.

8. The control device of the input display device as set forth in claim 5, wherein, in a case where a plurality of pen tip regions are determined to exist by the first determining processor:

the second determining processor specifies, for each of the plurality of pen tip regions, a palm region corresponding to the pen tip region in accordance with a relative position of the pen tip region and the palm region, the palm region corresponding to the pen tip region being a palm region in which the palm input can be determined to be carried out by the same user who inputs the pen tip input of the pen tip region; and the display switching controller switches the display direction of information in a display region corresponding to each of the plurality of pen tip regions on the display screen, in accordance with the relative position of the pen tip region and the palm region, the pen tip region and the palm region in which the pen tip input and the palm input are determined, by the second determining section, as being carried out by the same user, respectively.

9. A non-transitory recording medium in which a program for operating a computer as the control device of the input display device as set forth in claim 5 is stored, the program causing the computer to function as the control device of an input display device.

* * * * *